Figure 1:
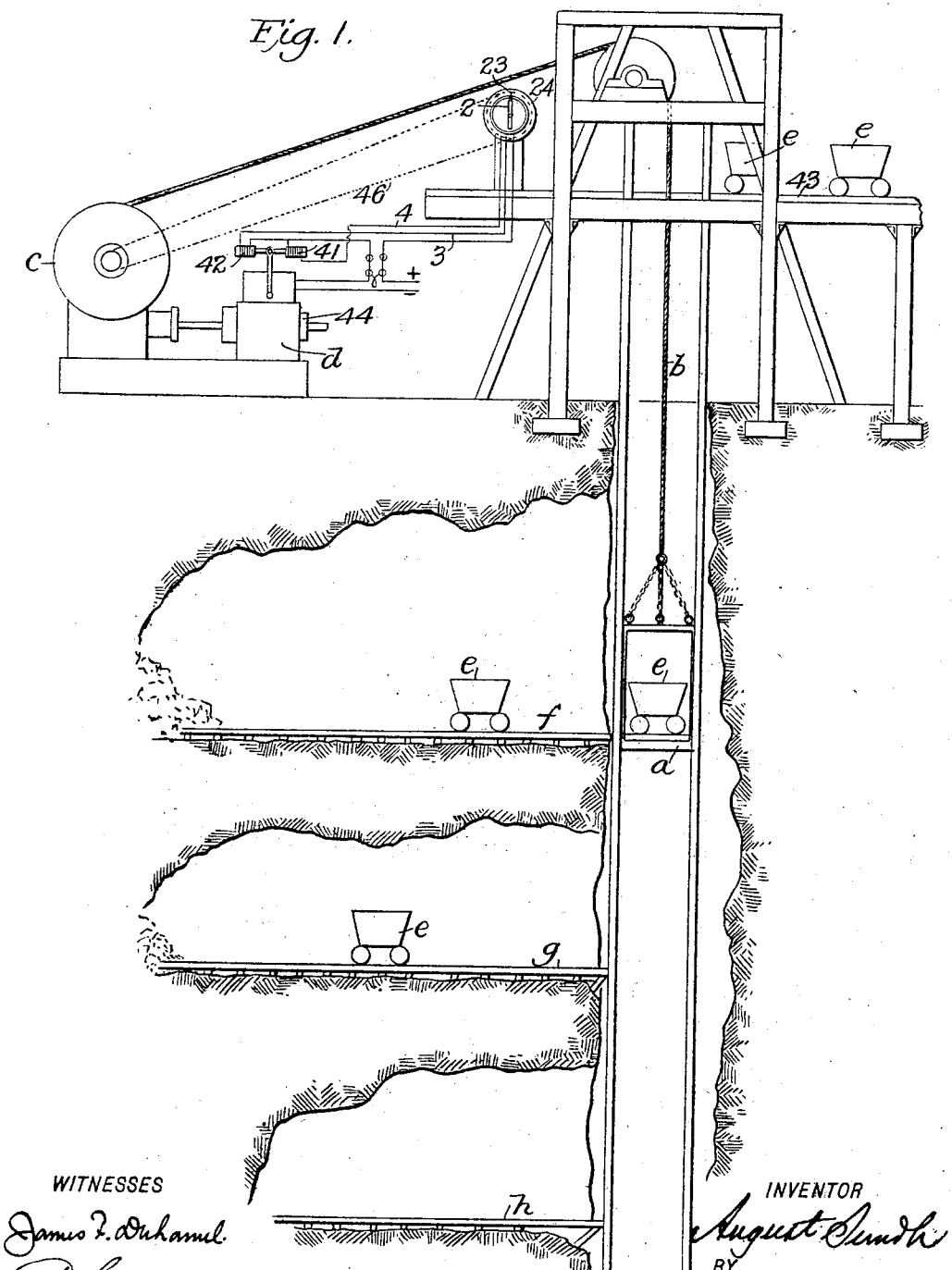

No. 645,766. Patented Mar. 20, 1900.
A. SUNDH.
CONTROLLING DEVICE FOR MECHANICAL APPARATUS.
(Application filed Sept. 9, 1899.)

(No Model.) 6 Sheets—Sheet 1.

WITNESSES
James F. Duhamel.
C. Sedgwick

INVENTOR
August Sundh
BY
A. P. Thayer
ATTORNEY

No. 645,766. Patented Mar. 20, 1900.
A. SUNDH.
CONTROLLING DEVICE FOR MECHANICAL APPARATUS.
(Application filed Sept. 9, 1899.)
(No Model.) 6 Sheets—Sheet 2.
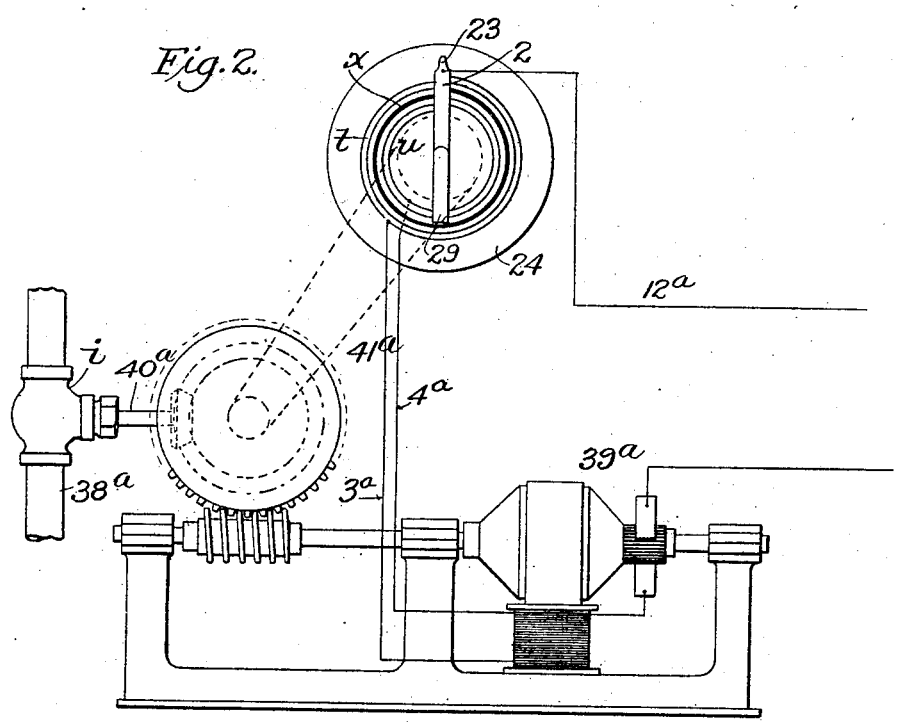
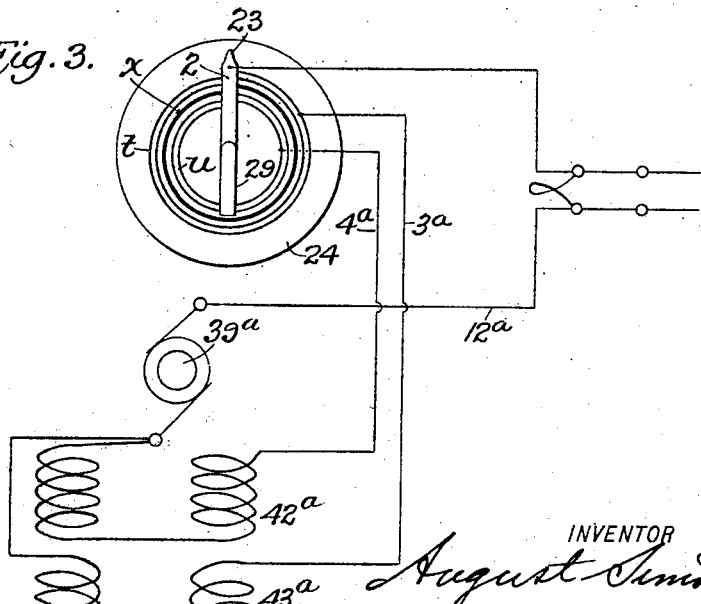
WITNESSES
James F. Duhamel
Sedgwick
INVENTOR
August Sundh
BY
H. P. Thayer
ATTORNEY No. 645,766. Patented Mar. 20, 1900.
A. SUNDH.
CONTROLLING DEVICE FOR MECHANICAL APPARATUS.
(Application filed Sept. 9, 1899.)

(No Model.) 6 Sheets—Sheet 3.

WITNESSES
James F. Duhamel.
Sedgwick

INVENTOR
August Sundh
BY
A. P. Thayer
ATTORNEY

No. 645,766. Patented Mar. 20, 1900.
A. SUNDH.
CONTROLLING DEVICE FOR MECHANICAL APPARATUS.
(Application filed Sept. 9, 1899.)

(No Model.) 6 Sheets—Sheet 4.

WITNESSES

INVENTOR
August Sundh
BY
A. P. Thayer
ATTORNEY

No. 645,766. Patented Mar. 20, 1900.
A. SUNDH.
CONTROLLING DEVICE FOR MECHANICAL APPARATUS.
(Application filed Sept. 9, 1899.)
(No Model.) 6 Sheets—Sheet 5.

WITNESSES
INVENTOR
ATTORNEY

No. 645,766. Patented Mar. 20, 1900.
A. SUNDH.
CONTROLLING DEVICE FOR MECHANICAL APPARATUS.
(Application filed Sept. 9, 1899.)
(No Model.) 6 Sheets—Sheet 6.
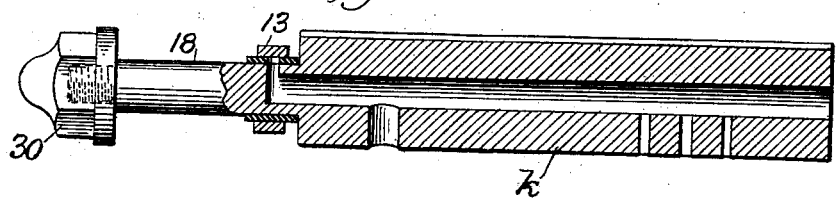
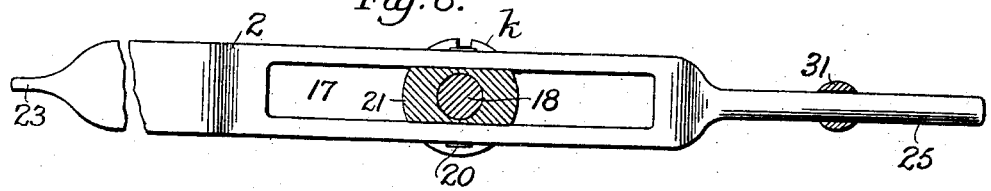
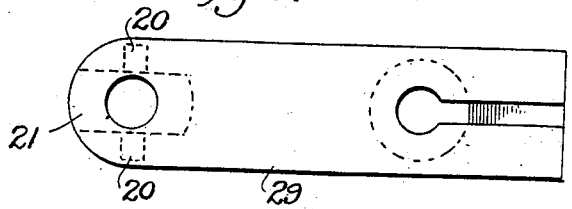
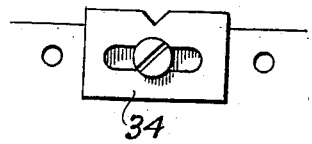
WITNESSES
INVENTOR
August Sundh
BY
A. P. Thayer
ATTORNEY

UNITED STATES PATENT OFFICE.

AUGUST SUNDH, OF YONKERS, NEW YORK.

CONTROLLING DEVICE FOR MECHANICAL APPARATUS.

SPECIFICATION forming part of Letters Patent No. 645,766, dated March 20, 1900.

Application filed September 9, 1899. Serial No. 730,004. (No model.)

*To all whom it may concern:*

Be it known that I, AUGUST SUNDH, of Yonkers, State of New York, have invented certain Improvements in Apparatus for Manually Starting and Concurrently Prearranging the Automatic Stopping of Intermittently-Working Machines, of which the following is a specification.

This invention, broadly stated, consists of a manually-rotatable circuit-closer electrically connected with a constantly-charged conductor and combined with one or more self-breaking branch circuits provided with mechanically-rotated terminals for the purpose of manually effecting the starting of an intermittently-working machine and concurrently prearranging for the greater or less duration of such working and the automatic stopping of the machine.

The rotatable terminals of the branch circuits are in the form of spiral metallic troughs insulated from each other and from the disk or face-plate which carries them. The circuit-closer, which is a stud adapted to be seated in and travel in either one of said troughs, is mounted upon and projects laterally from one end of an endwise-yielding lever adapted to be rotated upon an axis perpendicular to the said disk and also to be rocked upon an axis parallel with the said disk. The end of the lever opposite that carrying the contact-stud is constantly pressed toward the face-plate by a suitably-arranged spring and is provided with a laterally-projecting steady-pin adapted to travel upon the surface of the face-plate and while so traveling to hold the contact-stud in the trough in which it may be seated, and thereby maintain the closure of the one of the branch circuits connected with said trough. The face-plate is provided with a recess or cavity to receive the end of the steady-pin, and thus permit the lever to be so rocked as to disengage the stud from the trough, and thereby break the previously-closed branch circuit as soon as the mechanically-actuated face-plate has been rotated to the same extent as that to which the circuit-closer has been previously rotated.

The lengthening of the movable terminals, due to their spiral forms, permits the circuit-closer to be rotated more than one revolution, while maintaining its contact with either terminal. It follows that the movable terminals have so extended a range of possible motion before the circuit-closer is tripped out of connection with them that great scope is afforded for the employment of the apparatus for governing the operations of machines required to operate for various and comparatively-considerable periods of time or under a large variety of conditions.

The manually-rotatable circuit-closer, which is the prime member of the herein-described controlling apparatus, may for convenience be designated as the "governor," because in the operation in which it is employed the direction of its rotation when manually adjusted determines which branch circuit shall receive a supply of current, and the extent of its rotation governs the duration of such supply.

Figure 4:
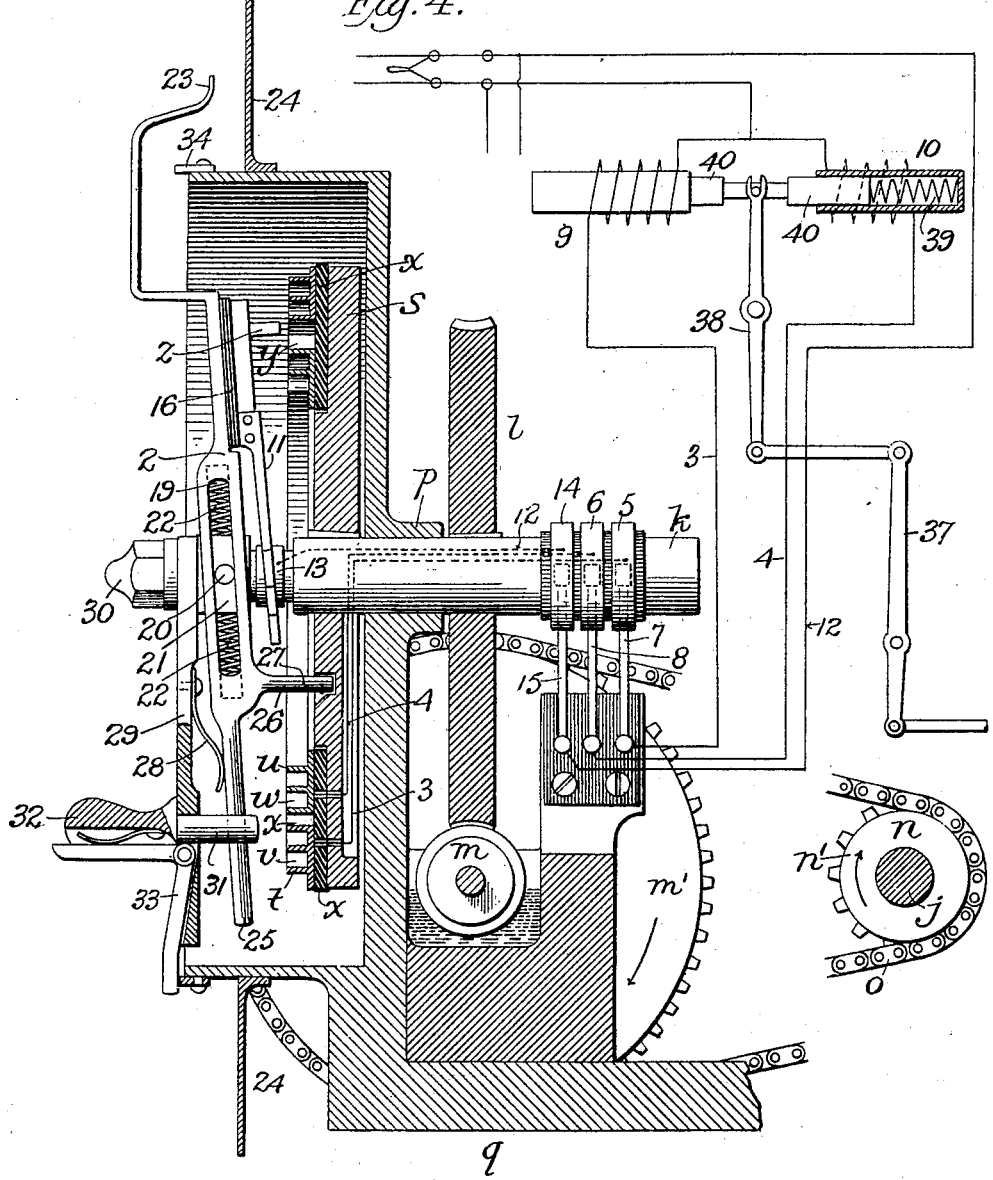
Figure 5:
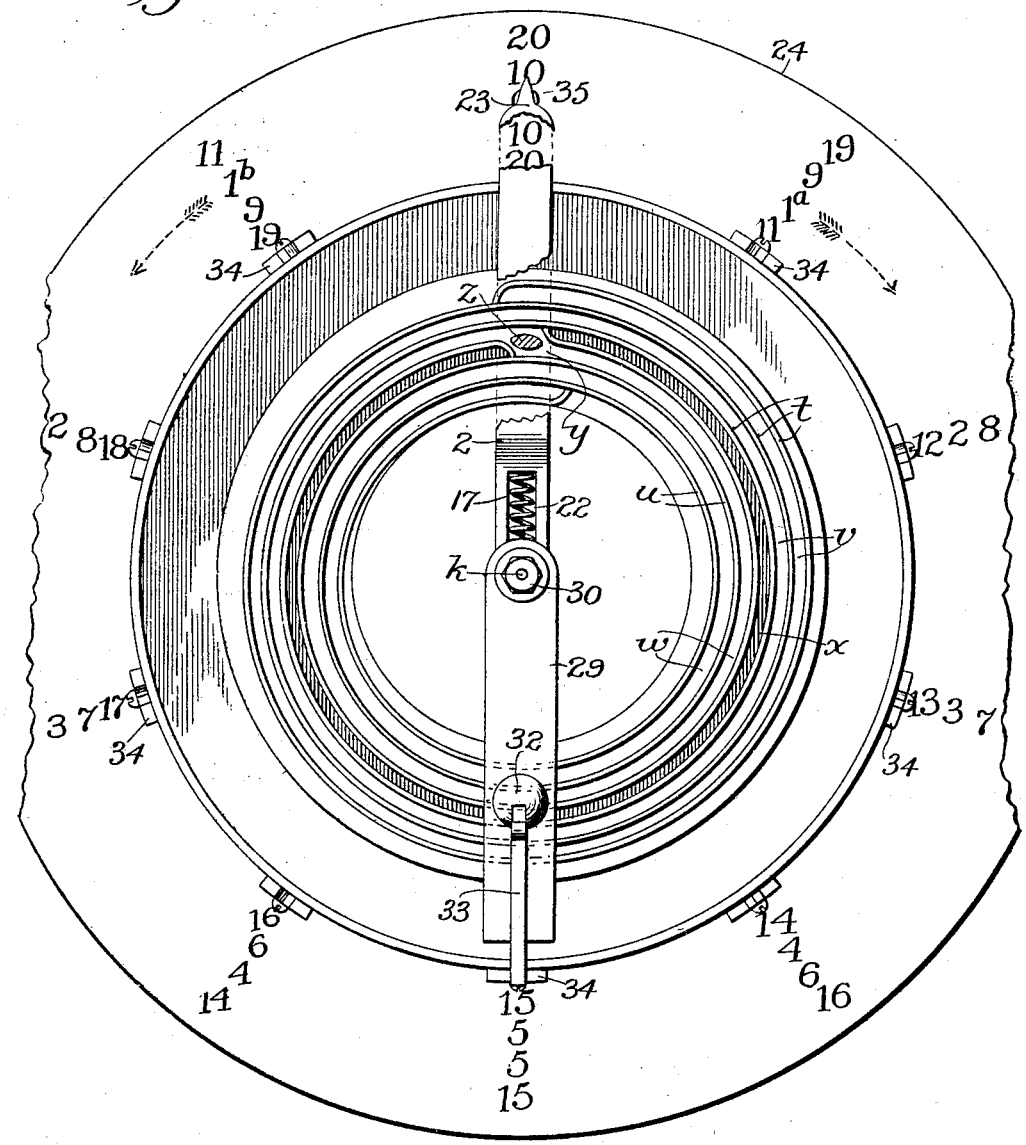
Figure 6:
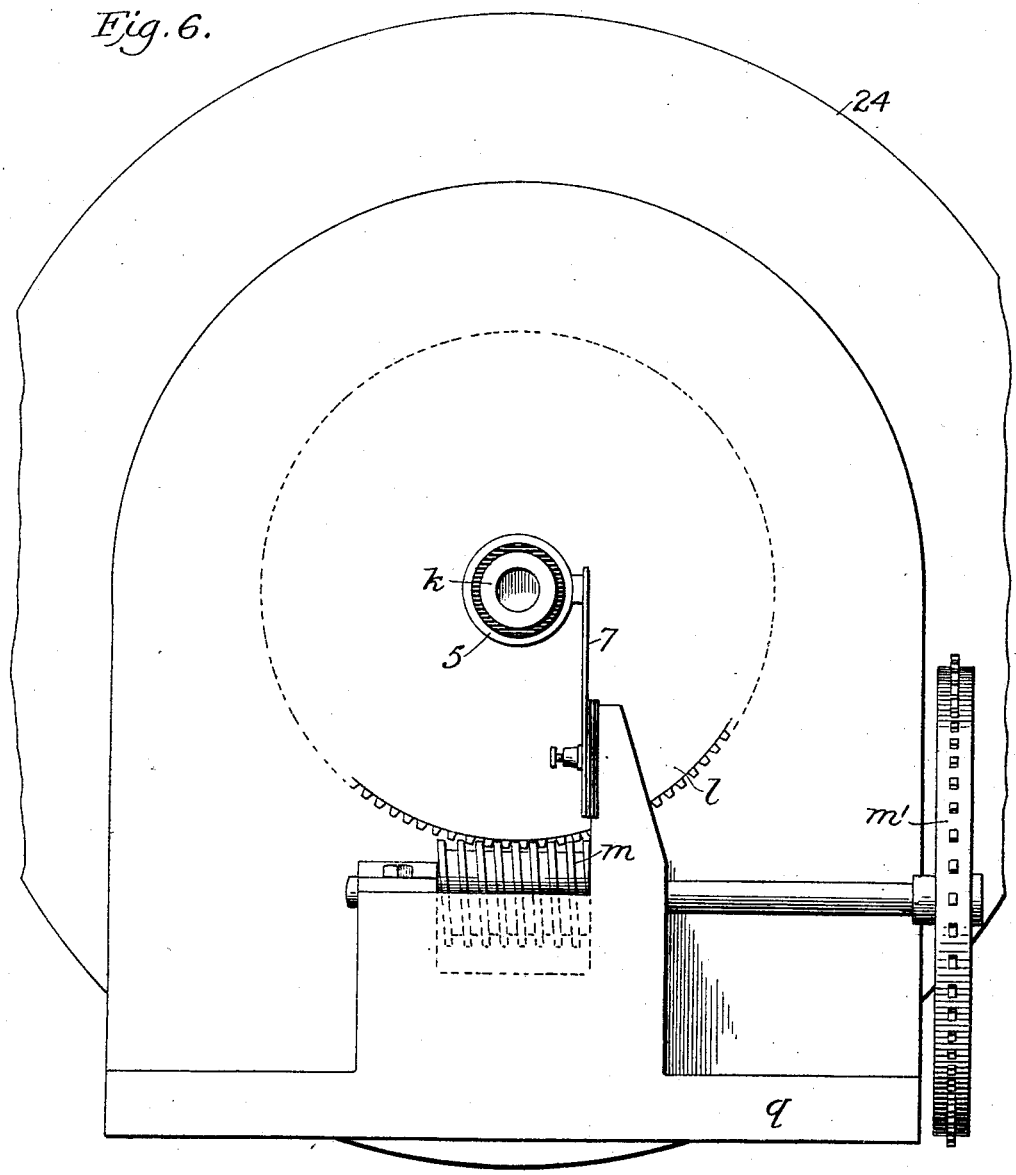

Several of the many possible applications of the invention are illustrated in the accompanying drawings and diagrams, which are as follows—to wit:

Figure 1 is an elevation of a mine-hoist equipped with my improved controlling apparatus. Fig. 2 is an elevation of apparatus for automatically opening and closing the throttle-valve of an engine. Fig. 3 is a diagram of the electric wire and contact system of the apparatus of Fig. 2. Fig. 4 is an axial section of the governing apparatus, diagrammatically illustrating its application to a valve-reversing lever. Fig. 5 is a front elevation of the governing apparatus of Fig. 4 on a larger scale. Fig. 6 is a rear elevation of the governing apparatus of Fig. 4. Fig. 7 is an elevation, partly in longitudinal section, of the shaft of the governing apparatus. Fig. 8 is a top view of the circuit-closer, showing its shaft in transverse section. Fig. 9 is a top view of the manually-rotatable arm for adjusting the circuit-closer. Fig. 10 is a view of the under side of the part of the circuit-closer to which the contact-stud is affixed, showing the brush for supplying the current thereto. Fig. 11 is a side elevation of a retaining-catch for the governor.

In Fig. 1, $a$ represents a mine hoist-elevator suspended by a rope $b$, which is connected with a drum $c$, operated by an electric motor $d$, for raising and lowering cars $e$ to and from different levels of the mine, as $f$ $g$ $h$.

In Fig. 2, i represents the throttle-valve of, say, a pumping-engine that it is desired shall be set in motion from time to time and continued in motion until a certain quantity of water has been raised and then be automatically stopped.

In the organization illustrated in Fig. 4 the shaft j is to be set in motion and stopped after running certain numbers of revolutions or periods of time in either direction, as the case may be.

For these and various other kindred mechanisms I provide a governing apparatus consisting of a rotatable shaft k, suitably geared to and deriving its motion from the apparatus to be controlled—as, for example, from the shaft j of a steam-engine, to which the shaft k may be geared—by the worm-wheel l, worm m, sprocket-wheels m' and n, and the endless chain o, so as to be rotated slowly. The shaft k is preferably mounted in a horizontal bearing p, having any suitable base q. A disk or face-plate s is keyed to and participates in the rotation of the shaft k. On one side of this face-plate are two spirally-curved metallic troughs t and u, each composed of two convolutions and respectively presenting the guide-grooves v and w. The troughs are insulated from each other and from the face-plate by suitable insulating material x. A switch-groove y leads from the inner end of the trough t to the outer end of the trough u. A contact-stud z, carried by the endwise-yielding manually-rotatable lever 2, is adapted to traverse either of the grooves v and w, according to the direction in which it is moved from the switch-groove y, and to thus close either of two branch circuits, according as the machine to be controlled is to be run in one direction or the other. Each of the metallic troughs may be concentrically curved when only a single convolution is required. The spiral form is for troughs required to have more than one convolution. In either case the metallic troughs t and u are literally the movable terminals of two branch circuits 3 and 4, in which are respectively included the insulated collars 5 and 6, mounted upon the shaft k, and the brushes 7 and 8. As shown in detail in Fig. 4, the branch circuits 3 and 4 may include the solenoid-coils 9 and 10 for operating a lever 38, which may be a valve-lever or may be the prime member of a train of mechanical connections for imparting operative motions to a valve-lever or other instrumentality. The contact-stud z is electrically connected with the supply-wire 12 of the main circuit through the brush 11, mounted on the lever 2, the insulated collars 13 and 14 on the shaft k, and the brush 15. The contact-stud z and the brush 11 are separated from the lever 2 by the insulating material 16. The lever 2 is provided midway of its length with a slot 17, enabling it to embrace the flattened hub 21 of a radius-arm 29, carried on the neck 18 of the shaft k, and also with a slot 19 in a plane at right angles to that of slot 17, enabling it to embrace the pivot-studs 20, carried by said hub 21. This construction permits the lever 2 to turn on the shaft k and to rock on the pivots 20 and also gives it the capacity of endwise movement. By means of expanding spiral springs 22 interposed between the ends of the slots 17 and 19 and the hub 21 the lever 2 is returned to its median position after having been shifted either way therefrom.

One extremity of the lever 2 forms a pointer 23, which ranges over a dial 24. The other end of the lever 2 is prolonged to form a handle 25. The handle 25 has affixed to it the steady-pin 26, which, by bearing against the surface of the face-plate s, serves to keep the contact-stud z in the trough t or u, as the case may be, and thus close one of the branch circuits, but which when seating itself in the recess 27 in the surface of the face-plate permits the lever 2 to rock upon the axis afforded for it by the pivots 20 and to thereby withdraw the contact-stud z, and thus break the previously-closed branch circuit. The steady-pin 26 is constantly pressed toward the face-plate, and thus made to enter the recess 27 by the push against the arm 25 of the spring 28, affixed to the radius-arm 29. The action of the spring 28 secures a quick "snap-break" of the circuit and correspondingly lessens the arc. The radius-arm 29, which is loosely mounted on the neck of the shaft k and thereon confined by the nut 30, communicates its rotating motions to the lever 2 by means of a fork 31, which is mounted on the radius-arm 29 and embraces the handle 25. The radius-arm 29 is provided with a handle 32 and with a spring-latch 33 for engaging any one of the series of notched catch-plates 34, located at predetermined setting-points around the dial, and by such engagement holding the lever 2 stationary in prescribed positions.

From the median point 35 on the dial 24 there are two graduated scales, each composed of two spiral convolutions, one scale gradually increasing in radius and reading "$1^a$, $2^a$, $3^a$, $4^a$," &c., up to "20," and the other scale gradually diminishing in radius and reading "$1^b$, $2^b$, $3^b$, $4^b$," &c., up to "20."

The shaft j, Fig. 4, may be assumed to be coupled in any well-known way with a steam-engine adapted for working in either direction, according as its link-motion or other reversing valve-gear may be set by the movement of the lever 38, induced by the influence of one or the other of the solenoid-coils 9 and 10. An expanding spiral spring 39 behind each of the solenoid-cores 40 operates to return the cores to their median position when the current is cut off and to thus set lever 38 and its connections in their median positions, in which the valve is made to close both induction-ports, and thus render the engine inoperative. It will be understood that weights may, if desired, be used as the equivalent for the springs 39. Suppose now it is desired to start the shaft j in motion in the direction indicated by the arrow $n'$ and to run it for a period of time corresponding to the time required for the face-plate to make, by virtue of its geared connection with the shaft $j$, say, one complete revolution. The handle 32 of arm 29 will be grasped, the latch 33 disengaged from the notch in which it is seated, the handle 25 at the same time raised, so as to withdraw the steady-pin 26 from the recess 27 and thrust the contact-stud $z$ into the switch-groove $y$ between the two troughs, and the lever 2 will then be turned one revolution in such direction as to move the contact-stud $z$ to the left along the trough $t$. Such motion, owing to the increasing radius of the trough $t$, will gradually shift the pointer 23 radially outward, so that it will come to rest immediately over the number "10." The lever 2 will then be held stationary by the engagement of the latch 33 with the same notch as before, but with the steady-pin 26 now resting on the surface of the face-plate $s$. The resulting engagement of the contact-stud $z$ with the trough $t$ will close the circuit through the solenoid 9, the core of which will then be drawn to the left, thus actuating the lever 38 and its connections as may be required to start the engine and set the shaft $j$ in motion in the direction indicated by the arrow $n'$ on Fig. 4. The face-plate $s$ will now be set into rotation in the same direction as that in which lever 2 has been rotated. When the face-plate $s$ has made one revolution, during which time the lever 2 will be shifted radially inward by the diminishing radius, the spiral trough $t$, acting on the contact-stud $z$, the steady-pin 26 will drop into the recess 27, and thus cause the withdrawal of the stud $z$ from the trough $t$ and the consequent breaking of the previously-closed branch circuit. The spring 39, acting on the core of the thus-deënergized solenoid 9, will then return the said core and the lever 38 into their median positions, and thereby again so set the valve as to stop the engine. The lever 2, or, as it may be conveniently designated, the "governor," may thus be utilized for starting an engine and running it any predetermined length of time, according as the gearing is proportioned and the scale graduated. If the engine to be controlled is only to be run in one direction, one trough only will be required; but for an engine, electric motor, or other machine required to run forward and backward the two troughs will be used. As will be seen, the lever 2 may be so rotated as to move the contact-stud into and along the trough $u$, which will close the circuit including the solenoid 10, and thereby reverse the motion of the lever 38, or, as illustrated in Fig. 2, if the valve $i$ is to be opened to supply an engine with steam or other actuating fluid through the service-pipe $38^a$ the appropriate movement of the lever 2 will close the circuit through and thus start an electric motor $39^a$, geared with the valve-stem $40^a$. The valve-stem $40^a$ will thus be turned in the proper direction to open the valve. At the same time the belt $41^a$, by which the valve-operating gears are also geared with the shaft $k$, will set the face-plate $s$ into rotation in the direction in which the lever 2 has been rotated, the preparatory adjustment of the lever 2 having been such that by the time the valve is open the steady-pin 26 will drop into the recess 27, and thus break the circuit which has previously supplied the current to actuate the motor $39^a$. The motor will then stop and the valve remain open until, when it is desired to close it, the lever 2 will be rotated in the reverse direction, by which the circuit will be again closed through the motor, but this time so as to rotate it in the reverse direction—i. e., in the direction for gradually closing the valve. The face-plate $s$ will be likewise turned in the reverse direction until the dropping of the steady-pin 26 into the recess 27 operates to again break the circuit by the time the valve is closed. In setting the governor for opening the valve the pointer 23 at the extremity of the lever 2 will be moved over the dial a greater or less distance, according as the valve is to be opened more or less, and for closing the valve the lever will be moved back over the dial the same distance as that to which it was moved for opening the valve. The reversely-wound coils $42^a$ and $43^a$ in the diagram Fig. 3 indicate the reverse windings of the field-coils of the motor $39^a$, whereby the motor operates in reverse directions, according as the circuit is closed through the troughs $t$ or $u$ and circuit-wires $3^a$ or $4^a$, $12^a$ being the supply-wire.

In operating a mine-hoist, Fig. 1, if it be desired to lower the car from the platform 43 to the first level $f$ the governor will be rotated to the right hand, say, until the pointer 23 stands over number "7" of the inner spiral scale of the dial, which will close the branch circuit 4, including the solenoid 41, and thereby cause the core of the solenoid 41 to be shifted to the right hand, and thus set the motor 44 and the drum 45 in motion for lowering the car, the parts being so proportioned that the car will come to rest at the level $f$ in consequence of the timely breaking of the circuit resulting from the rotation of the face-plate $s$ by the driving-belt 46. The face-plate will then rest with its median point 35 in the radial line in which the pointer was set. Then if it be desired to further lower the elevator-car—say to level $g$—the governor will be again rotated farther along the same scale to the appropriate number, thereby again starting the motor and lowering the car until it is brought to rest at the level $g$ by resultant further rotation of the face-plate $s$. Similarly the car may be lowered to the lowest level $h$ or to any one of a multiplicity of levels. The car may be raised from level to level by rotating the governor in the opposite direction step by step, as desired, or the car may be continuously raised to the platform 43 by at once turning the governor backward a distance equal to the sum of all the setting movements of the governor by which the car has been lowered, in which case the branch circuit 3, including the solenoid 42, will be closed and the motor 44 resultantly so operated as to cause the ascent of the car.

My governing apparatus may without departure from the invention be varied in its mechanical details. Thus it may be given a greater range of controlling capacity by the expedient of increasing the number of convolutions of the spiral contact-troughs or by the expedient of appropriately changing the proportions of the gearing by which motion is imparted to the face-plate carrying the contact-troughs, or by the adoption, if desired, of both expedients. The two self-breaking branch circuits may be employed not only to furnish the current for effecting the operation of a machine in different directions at different times, but also for effecting the operation at different times of two different machines. If the control to be exercised should merely consist in the predetermination of the duration of the various working periods of a machine required to run only in one direction, then of course one of the self-breaking branch circuits would be dispensed with. The invention would then be present in its simplest form, consisting of a circuit closer and breaker composed of two movable terminals—one manually adjustable for the purpose of moving it against and along the surface of the other to a predetermined setting-point and the other terminal operated mechanically by motion derived from the machine or apparatus caused to be started by the current flowing through the closed circuit—and means for effecting the automatic breaking of the circuit concurrently with the completion by the mechanically-moved terminals of a range of movement corresponding to the range of movement of the manually-adjusted terminal.

What is claimed as the invention is—

1. The combination of a machine or apparatus requiring to be controlled, with an electric circuit; a circuit closer and breaker composed of two movable terminals, one manually adjustable for the purpose of moving it against and along the surface of the other to a predetermined setting-point and thereby more or less prolonging the duration of the closure of the circuit; means for mechanically operating the other terminal by motion derived from the machine or apparatus caused to be started by the current flowing through the closed circuit, and thereby effecting the automatic breaking of the circuit concurrently with the completion, by the mechanically-moved terminal, of a range of movement corresponding in length to the length of the range of previous movement of the manually-adjusted terminal but proportioned in time to the relative speeds of the machine or apparatus to be controlled, and the mechanically-operated terminal.

2. The combination of a machine or apparatus requiring to be controlled, with an electric circuit; a circuit closer and breaker composed of two movable terminals, one manually adjustable for the purpose of moving it against and along the surface of the other to a predetermined setting-point and thereby more or less prolonging the duration of the closure of the circuit; means for mechanically operating the other terminal by motion derived from the machine or apparatus caused to be started by the current flowing through the closed circuit; means for effecting the automatic breaking of the circuit concurrently with the completion, by the mechanically-moved terminal, of a range of movement corresponding to the range of previous movement of the manually-adjusted terminal; an indicating-scale for gaging the relative movements of the apparatus to be controlled and the terminal operated therefrom, and a pointer carried by said manually-adjustable terminal, said pointer having a path of movement in appropriate proximity to said scale.

3. In an electric controlling device, in combination with a machine or apparatus to be controlled, a main electric circuit; a rotatable face-plate; mechanical gearing for transmitting from said machine or apparatus motion to rotate said face-plate; two branch circuits with suitably-curved terminals carried on said face-plate; a manually-adjustable contact-stud for more or less prolonged contact with either of said curved terminals after having been manually rotated in either direction to and lodged in a predetermined setting-point on the face-plate for closing either one of said branch circuits according to the direction of its rotating movement and for maintaining such closure during the ensuing rotation of said face-plate, and means for automatically breaking such closed circuit concurrently with the completion by the face-plate of a range of rotative movement corresponding in length to the length of the range of the previous adjusting movement of said contact-stud but proportioned in time to the relative speeds of the machine or apparatus to be controlled, and the face-plate geared thereto.

4. In an electric controlling device, in combination with the machine or apparatus to be controlled, a main electric circuit; a rotatable face-plate geared to said machine or apparatus for being rotated by motion derived therefrom; two branch circuits having spirally-curved terminals carried on said face-plate; a contact-stud for engaging either of said terminals and thereby closing either of said branch circuits; a lever for carrying said contact-stud, the said lever rotatable in a plane parallel with the plane of said face-plate and vibratable in a plane perpendicular to the plane of said face-plate; a steady-pin on said lever for bearing upon the surface of said face-plate and thereby maintaining said contact-stud in engagement with either of said spirally-curved terminals during the period while said face-plate is required to be mechanically rotated; a suitably-arranged recess or cavity, in the surface of said face-plate and a spring for pressing toward the face-plate the end of said lever to which said steady-pin is attached, whereby when said face-plate has completed a rotative movement corresponding to the rotative movement previously imparted to the manually-adjusted contact-stud said steady-pin will be forced into said recess by said spring and the contact-stud thereby tripped out of engagement with the terminal of the previously-closed branch circuit.

5. In an electric controlling device, in combination with a machine or apparatus to be controlled, a main electric circuit; a rotatable face-plate gearing for transmitting from said machine or apparatus motion to rotate said face-plate; two branch circuits electrically connected respectively with two spirally-curved and suitably-insulated metallic troughs carried on said face-plate; a manually-adjustable contact-stud electrically connected with the main supply-circuit for engaging either of said troughs and thereby closing either of said branch circuits; an endwise-yielding lever for carrying said contact-stud, the said lever rotatable in a plane parallel with the plane of said face-plate and vibratable in a plane perpendicular to the plane of said face-plate; means for maintaining said contact-stud in position to be engaged by either of said spirally-curved troughs during a predetermined range of movement of said mechanically-rotated face-plate, and means for tripping said stud out of such engagement concurrently with the completion by said face-plate of a range of rotative movement corresponding to the range of previous rotative movement of the manually-adjustable contact-stud.

6. In an electric controlling device, in combination with a machine or apparatus to be controlled, a main electric circuit; a rotatable face-plate, gearing for transmitting from said machine or apparatus, motion to rotate said face-plate; two branch circuits electrically connected respectively with two suitably curved and insulated terminals carried on said face-plate; a manually-adjustable contact-stud electrically connected with the main supply-circuit for more or less prolonged engagement by either of said terminals; a lever for carrying said contact-stud, the said lever rotatable in a plane parallel with the plane of rotation of said face-plate and vibratable in a plane perpendicular to the plane of said face-plate; a manually-operative radius-arm rotative upon an axis coincident with the axis of rotation of said face-plate for controlling the rotative movement of said contact-stud-carrying lever, and means, such as latching devices, for holding said radius-arm stationary at prescribed points.

7. In an electric controlling device, the combination with the machine or apparatus to be controlled, a main electric circuit, a rotating face-plate geared with said machine to be actuated thereby; a branch circuit electrically connected with a spiral contact-trough carried on the face-plate; a contact-stud for engaging said trough; an endwise-reciprocable lever, for carrying said stud, pivotally and lengthwise movably mounted on an axial shaft of said face-plate, so that the contact-stud may be shifted around the face-plate and be set in a predetermined position and the trough may traverse the stud; a steady-pin on said lever bearing on the surface of the face-plate to maintain contact of said trough and stud; a recess in said face-plate for admitting said steady-pin and thereby breaking said contact according to a predetermined adjustment; a radius-arm loosely mounted on an axial shaft of the face-plate for controlling the lever; a latch for holding said radius-arm stationary and springs for longitudinally centralizing said endwise-reciprocable lever.

8. In apparatus for manually causing the starting of intermittently-working machines and concurrently prearranging for the greater or less duration of the ensuing working period and the automatic stopping of the machine at the expiration of the predetermined period; a manually-rotatable circuit-closer electrically connected with a main supply-circuit; a plurality of branch circuits provided with suitably-insulated terminals consisting of independent spiral metallic troughs carried upon a disk or face-plate rotatable in a plane parallel to the plane of rotation of said circuit-closer; means for transmitting, from said machine, motion to rotate said disk or face-plate in the same direction as that in which the said circuit-closer has been previously rotated, and means for effecting the breaking of the circuit concurrently with the completion, by the mechanically-moved terminal, of a range of movement corresponding to the range of previous movement of the said manually-operative circuit-closer.

9. Apparatus for manually effecting the starting, in either direction, of intermittently-working machines and concurrently prearranging for the greater or less duration of the ensuing working period and the automatic stopping of the machine at the expiration of the prearranged period, said apparatus consisting essentially of a manually-rotatable circuit-closer electrically connected with a main supply-circuit and two self-breaking branch circuits provided with rotatable terminals adapted for more or less prolonged engagement with said circuit-closer according to the prearranged duration of said working period; in combination with electrical and mechanical connections for effecting the starting into motion of said intermittently-working machine and mechanical gearing for transmitting motion from said machine to effect the rotating movement of said terminals in one direction or the other according to the direction of movement of said machine.

Signed by me at New York, N. Y., this 26th day of August, 1899.

AUGUST SUNDH.

Witnesses:
A. P. THAYER,
C. SEDGWICK.